(12) United States Patent
Ahlawat

(10) Patent No.: US 9,634,460 B2
(45) Date of Patent: Apr. 25, 2017

(54) COMPENSATION FOR A DISTURBANCE IN AN OPTICAL SOURCE

(71) Applicant: Cymer, LLC, San Diego, CA (US)

(72) Inventor: Rahul Ahlawat, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 15/014,149

(22) Filed: Feb. 3, 2016

(65) Prior Publication Data

US 2016/0161859 A1 Jun. 9, 2016

Related U.S. Application Data

(63) Continuation of application No. 14/565,016, filed on Dec. 9, 2014, now Pat. No. 9,261,794.

(51) Int. Cl.

| | | |
|---|---|---|
| *H01S 3/22* | (2006.01) | |
| *H01S 3/104* | (2006.01) | |
| *H01S 3/097* | (2006.01) | |
| *H01S 3/134* | (2006.01) | |
| *H01S 3/139* | (2006.01) | |
| *H01S 3/225* | (2006.01) | |
| *H01S 3/137* | (2006.01) | |
| *H01S 3/0971* | (2006.01) | |
| *H01S 3/1055* | (2006.01) | |
| *H01S 3/23* | (2006.01) | |
| *H01S 3/036* | (2006.01) | |
| *H01S 3/10* | (2006.01) | |

(52) U.S. Cl.
CPC .......... *H01S 3/104* (2013.01); *H01S 3/09705* (2013.01); *H01S 3/134* (2013.01); *H01S 3/139* (2013.01); *H01S 3/22* (2013.01); *H01S 3/2251* (2013.01); *H01S 3/2256* (2013.01); *H01S 3/036* (2013.01); *H01S 3/0971* (2013.01); *H01S 3/1055* (2013.01); *H01S 3/10069* (2013.01); *H01S 3/137* (2013.01); *H01S 3/225* (2013.01); *H01S 3/2308* (2013.01); *H01S 2301/02* (2013.01)

(58) Field of Classification Search
CPC ...... H01S 3/225; H01S 3/2251; H01S 3/2256; H01S 3/22; H01S 3/137; H01S 3/09705; H01S 3/134; H01S 3/104
USPC ................................... 372/57, 55, 32, 29.02
See application file for complete search history.

(56) References Cited

U.S. PATENT DOCUMENTS

| | | |
|---|---|---|
| 6,532,247 B2 | 3/2003 | Spangler et al. |
| 8,254,420 B2 | 8/2012 | Riggs et al. |
| 8,855,166 B2 | 10/2014 | Ujazdowski et al. |

(Continued)

OTHER PUBLICATIONS

International Search Report and Written Opinion mailed on Jan. 19, 2016 in PCT Application No. PCT/US15/63802 (7 pages).

*Primary Examiner* — Kinam Park
(74) *Attorney, Agent, or Firm* — DiBerardino McGovern IP Group LLC

(57) ABSTRACT

A pulsed light beam emitted from an optical source is received, the pulsed light beam being associated with a temporal repetition rate; a frequency of a disturbance in the optical source is determined, the frequency being an aliased frequency that varies with the temporal repetition rate of the pulsed light beam; a correction waveform is generated based on the aliased frequency; and the disturbance in the optical source is compensated by modifying a characteristic of the pulsed light beam based on the generated correction waveform.

22 Claims, 11 Drawing Sheets

(56) References Cited

U.S. PATENT DOCUMENTS

| | | | |
|---|---|---|---|
| 2002/0006149 A1* | 1/2002 | Spangler | G03F 7/70025 372/61 |
| 2002/0154669 A1* | 10/2002 | Spangler | G03F 7/70025 372/55 |
| 2006/0222034 A1 | 10/2006 | Ujazdowski et al. | |
| 2012/0228526 A1* | 9/2012 | Vaschenko | G03F 7/70033 250/504 R |

* cited by examiner

COMPENSATION FOR A DISTURBANCE IN AN OPTICAL SOURCE

CROSS-REFERENCE TO RELATED APPLICATION

This application is a continuation of U.S. patent application Ser. No. 14/565,016, filed Dec. 9, 2014, now allowed, and titled COMPENSATION FOR A DISTURBANCE IN AN OPTICAL SOURCE, which is incorporated herein by reference in its entirety.

TECHNICAL FIELD

The disclosed subject matter relates to active rejection of a disturbance in an optical source.

BACKGROUND

Photolithography is the process by which semiconductor circuitry is patterned on a substrate such as a silicon wafer. A photolithography light source provides the deep ultraviolet (DUV) light used to expose a photoresist on the wafer. DUV light for photolithography is generated by excimer light sources. Often, the light source is a laser source and the pulsed light beam is a pulsed laser beam. The light beam is passed through a beam delivery unit, filtered through a reticle (or mask), and then projected onto a prepared silicon wafer. In this way, a chip design is patterned onto a photoresist that is then etched and cleaned, and then the process repeats.

SUMMARY

In one general aspect, a method of compensating for a disturbance in an optical source includes receiving a pulsed light beam emitted from an optical source, the pulsed light beam being associated with a temporal repetition rate; determining a frequency of a disturbance in the optical source, the frequency being an aliased frequency that varies with the temporal repetition rate of the pulsed light beam; generating a correction waveform based on the aliased frequency; and compensating for the disturbance in the optical source by modifying a characteristic of the pulsed light beam based on the generated correction waveform. Implementations can include one or more of the following features. Compensating for the disturbance in the optical source by modifying a characteristic of the pulsed light beam based on the generated correction waveform can include applying the correction waveform to an optical assembly that includes an optical element positioned to interact with light that propagates in the optical source, the application of the correction waveform to the optical assembly being sufficient to move the optical element. The characteristic of the pulsed light beam can include a wavelength of the pulsed light beam. The correction waveform can include an amplitude that is substantially the same as an amplitude of the disturbance and a phase that is shifted relative to a phase of the disturbance. The phase of the correction waveform can be shifted by one hundred and eighty degrees relative to the phase of the disturbance.

The frequency of the disturbance can include a plurality of frequencies that are separate and distinct from each other. The plurality of frequencies can include a fundamental frequency associated with the disturbance and one or more harmonics of the fundamental frequency.

In some implementations, the method also includes estimating, based on the determined aliased frequency of the disturbance in the optical source, states associated with the disturbance, and where generating a correction waveform based on the aliased frequency includes generating a correction waveform based on the estimated states associated with the disturbance. The states associated with the disturbance can include a first state and a second state. The first state can be an in-phase component, and the second state can be a quadrature component. Generating a correction waveform based on the estimated states can include generating a waveform having a magnitude based on the vector sum of the in-phase and quadrature component and a phase based on a ratio of the quadrature component to the in-phase component.

In some implementations, the method also includes determining a first frequency spectrum of the pulsed light beam emitted from the optical source before compensating for the disturbance, the first frequency spectrum including a first amount of power at the frequency of the disturbance; and determining a second frequency spectrum of a second pulsed light beam emitted from the optical source after compensating for the disturbance, the second frequency spectrum including a second amount of power at the frequency of the disturbance, the second amount of power being less than the first amount of power. The second amount of power can be at least 5 decibels (dB) less than the first amount of power at the frequency of the compensated disturbance.

The temporal repetition rate can be measured. Data that includes the temporal repetition rate can be received.

The frequency of the disturbance in the optical source can be determined based on the temporal repetition rate of the pulsed light beam. Determining the frequency of the disturbance based on the temporal repetition rate can include: accessing a frequency map, the frequency map including a frequency of the disturbance as a function of temporal repetition rate, and determining the frequency of the disturbance associated with the accessed temporal repetition rate from the accessed frequency map. The frequency map can include a plurality of frequencies for each temporal repetition rate.

Determining the frequency of the disturbance can include receiving data that includes the value of the frequency of the disturbance.

The optical element can be positioned to select a spectral feature of the light that propagates in the chamber, and moving the optical element can change the selected spectral feature of the light. The spectral feature can be a wavelength of the light that propagates in the chamber. The optical element can be an optical element that transmits the light that propagates in the chamber. The optical element can be a prism.

The optical source can include a gain medium, the light that propagates in the optical source can propagates along the beam path and in the gain medium, the optical element can be positioned along the beam path, and the disturbance in the source can include a disturbance that creates a heterogeneity in the gain medium along the beam path. The disturbance in the optical source can include an acoustical disturbance caused by the motion of a fan that circulates the gain medium in the chamber.

In some implementations, the disturbance in the optical source further includes a secondary disturbance, and the method also includes receiving a wavelength measurement of the pulsed light beam, the wavelength measurement including a wavelength error for a plurality of pulses in the pulsed light beam; accessing a model representing a secondary disturbance in the optical source; accessing a model representing dynamics of the actuator; and generating a second correction waveform based on one or more of the wavelength error, the model of the secondary disturbance, and the model representing dynamics of the actuator, where applying the correction waveform to the optical assembly further includes applying the second correction waveform the optical assembly. The second correction waveform can be generated regardless of whether a wavelength measurement is received.

In another general aspect, a method of compensating for a disturbance in an optical source includes receiving a pulsed light beam emitted from an optical source, the pulsed light beam being associated with a temporal repetition rate; determining a frequency of a disturbance in the optical source; repeatedly estimating a value of at least one state that represents a characteristic of the disturbance, the estimate being updated at a control event frequency that is equal to or greater than the temporal repetition rate; generating an instance of a correction waveform for each estimated value of the at least one state, the instances of the correction waveform being generated at the control event frequency; and compensating for the disturbance in the optical source by applying an instance of the correction waveform to the optical source, the compensation being applied to the optical source at the control event frequency.

The disturbance in the optical source can be associated with a plurality of distinct frequencies.

Implementations of any of the techniques described above may include a method, a process, a device, a computer-program product tangibly embodied in a non-transitory machine-readable storage medium, the product including instructions that, when executed, cause one or more electronic processors perform various actions, or an apparatus. The details of one or more implementations are set forth in the accompanying drawings and the description below. Other features will be apparent from the description and drawings, and from the claims.

DRAWING DESCRIPTION

DETAILED DESCRIPTION

Techniques for actively and continuously compensating for and/or rejecting a disturbance in an optical (or light) source are disclosed. The disturbance can be a narrowband disturbance that is made up of one or more frequencies or tones, each of which are present in just a single frequency or spread over a band of a few frequencies. The optical source produces light having a wavelength that is nominally at a center wavelength. During operation of the optical light source, the wavelength of the produced light can deviate from the center wavelength. The difference between the center wavelength and the actual wavelength for a portion of light emitted from the source over a period of time is the wavelength error as a function of time. The wavelength error can be transformed into a wavelength error as a function of frequency, which provides a measure of the contribution of each frequency to the wavelength error. Wavelength sigma is the variation (standard deviation) of the wavelength error over a fixed number of pulses of light emitted from the optical source. The compensation technique discussed below leads to a reduction in wavelength sigma and a corresponding improvement in contrast and image quality in a photolithography system that uses the optical source to pattern microelectronic features onto a wafer.

Figure 1:
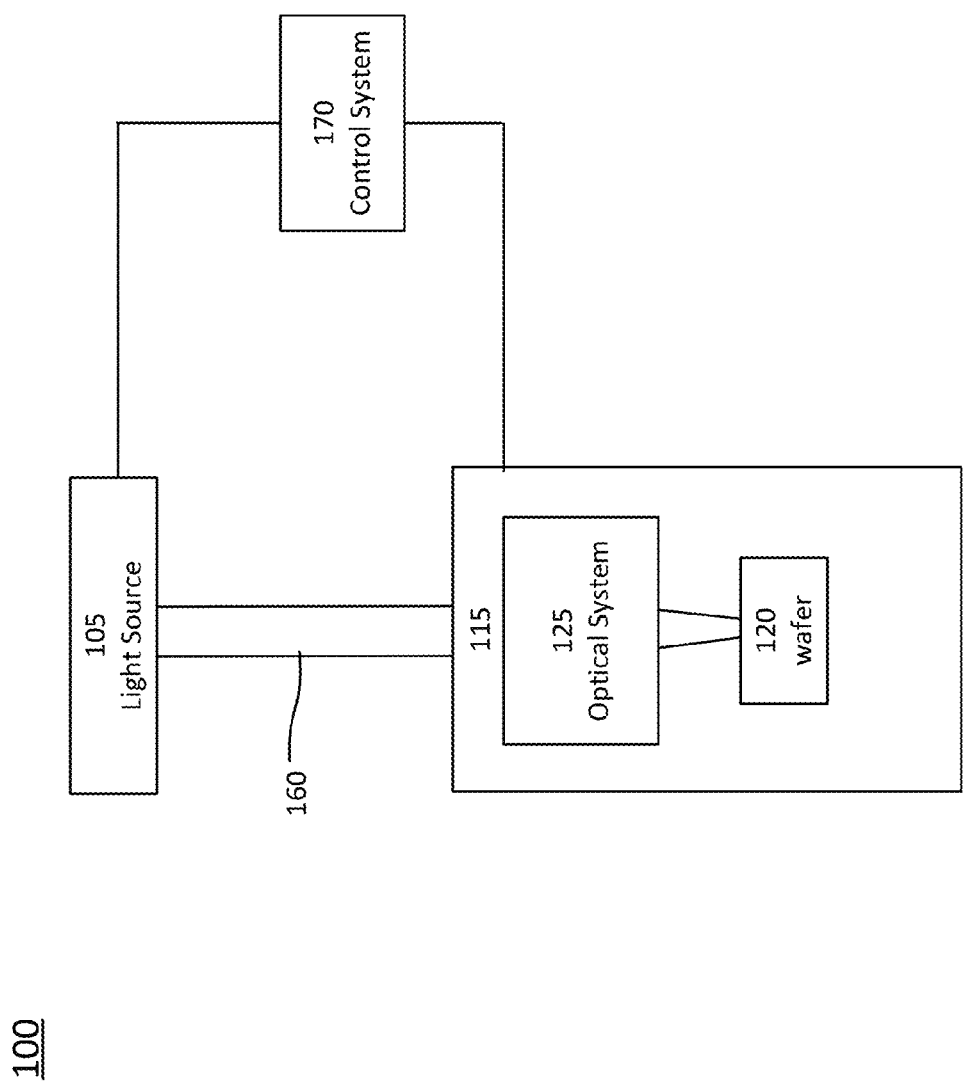
FIG. 1 is a block diagram of an exemplary photolithography system.

Referring to FIG. 1, a photolithography system 100 includes an optical (or light) source 105 that provides a light beam 160 to a wafer 120. The photolithography system 100 also includes a lithography exposure apparatus 115 that receives the wafer 120. The lithography exposure apparatus 115 includes a projection optical system 125. Microelectronic features are formed on the wafer 120 by, for example, depositing a layer of radiation-sensitive photoresist material on the wafer 120, and exposing the masked photoresist layer with the light beam 160. The lithography exposure apparatus 115 can be a liquid immersion system or a dry system. The system 100 also includes a controller 170 that controls the emission of light from the light source 105.

The light beam 160 radiates at a band of wavelengths that are distributed about a center wavelength. The critical dimension (CD), which is the smallest feature size that can be printed on the wafer 120 by the system 100, depends on the wavelength of the light beam 160. To maintain a uniform CD for microelectronic features printed on the wafer 120, and on other wafers exposed by the system 100, the wavelength of the light beam 160 should remain at the center wavelength or within a range of wavelengths around the center wavelength. The difference between the nominal or desired center wavelength and the actual or measured wavelength of the light beam 160 is the wavelength error.

The wavelength error can be determined as a function of time for a portion of the light beam 160. For example, the wavelength of the light beam 160 can be sampled at a plurality of different times, and the wavelength error can be determined for each time by comparing the measured wavelength to the center wavelength. In implementations in which the light beam 160 is a pulsed beam, the wavelength error can be determined for all or a portion of pulses in a burst that includes many, perhaps hundreds, of pulses. The frequency content of the wavelength error for the block of time or the burst can be determined by transforming the wavelength error as a function of time to a function of frequency, by, for example, applying a Fourier transform to the temporal wavelength error data. The result of this transformation reveals the relative contribution (or relative power) of wavelength error at different frequencies and is referred to as the power spectral density (PSD) of the wavelength error. The standard deviation of the PSD of the wavelength error is the wavelength sigma. Like variations in in-slit bandwidth, variations in wavelength sigma affect contrast and, thus, image quality. As such, reducing wavelength sigma improves the performance of the system 100.

A narrowband disturbance in the optical source 105 can cause an increase in wavelength sigma. The narrowband disturbance is any disturbance that is present only at one frequency or within a band of just a few frequencies of the frequency spectrum. For example, the narrowband disturbance can be present within a band that includes just a single frequency (in Hertz (Hz)). In another example, the narrowband disturbance can be a disturbance that is associated with a center frequency and has a band that extends over a range of frequencies. The maximum amplitude of the narrowband disturbance can occur at the center frequency, and the magnitude of the disturbance can significantly attenuate, steeply decline, and/or be non-existent at frequencies other than the center frequency. The band of the narrowband disturbance can be, for example, a contiguous range or a band of frequencies that are between two frequencies (a first frequency and a second frequency) that fall on either side of the center frequency, with the first frequency being a frequency that is lower than the center frequency and the second frequency being a frequency that is higher than the center frequency. For example, the first and second frequencies can be the frequencies nearest to the center frequency at which the magnitude of the disturbance is three (3) decibels (dB) less than the magnitude of the narrowband disturbance at the center frequency. In this example, the absolute value of the difference between the first and second frequencies is the band of the narrowband disturbance in Hertz. The band can be, for example, ten (10) Hertz or less. In some implementations, the narrowband disturbance is made up of a plurality of tones, each having a distinct and separate center frequency and band.

The narrowband disturbance can be caused by, for example, a component in the optical source 105 that moves in a periodic or regular manner, which may induce disturbances in the beam path increasing pulsed beam's wavelength error. Because a narrowband disturbance results in a spike or sharp increase in wavelength error at the frequency associated with the disturbance, when a narrowband disturbance is present, the PSD of the wavelength error includes a spike at the frequency of the disturbance. Due to the spike, the standard deviation of the PSD tends to increase when there is a narrowband disturbance in the optical source 105, thus, the wavelength sigma also tends to increase.

As discussed above, the narrowband disturbance can be made up of a plurality of tones, each having a distinct and separate center frequency and band. An example of this is a narrowband disturbance that has a fundamental frequency and harmonics of the fundamental frequency. In this example, the PSD of the wavelength error includes spikes in power (dB/Hertz) at the fundamental frequency and the harmonics of the fundamental frequency.

The characteristics of the narrowband disturbance can change during operation of the optical source 105. For example, if the disturbance is acoustic in nature, temperature can affect the amplitude and phase of the narrowband disturbance, as well as the frequency. Thus, the characteristics of the narrowband disturbance are dynamically estimated during operation of the optical source 105. The characteristics of the narrowband disturbance can include the amplitude, phase, and frequency of the disturbance. These characteristics can be modeled as states that have estimated values that can vary over time.

Because the narrowband disturbance is present at only one frequency or only within a band of a few Hertz, once the characteristics of the narrowband disturbance are estimated, the narrowband disturbance can be countered with a corresponding correction waveform that is based on the estimated characteristics. The correction waveform can be, for example, a sinusoid having the same frequency and magnitude as the narrowband disturbance, and a phase that is 180° out of phase with the narrowband disturbance. After the correction waveform is applied, the contribution at the frequency of the disturbance, which is visible in the PSD of the wavelength error, is reduced. In this manner, the wavelength sigma can be reduced.

In some implementations, the control system 170 applies the correction waveform in addition to a separate correction or compensation that reduces the wavelength error of the light beam 160 to result in an even greater improvement in overall system performance.

Figure 2:
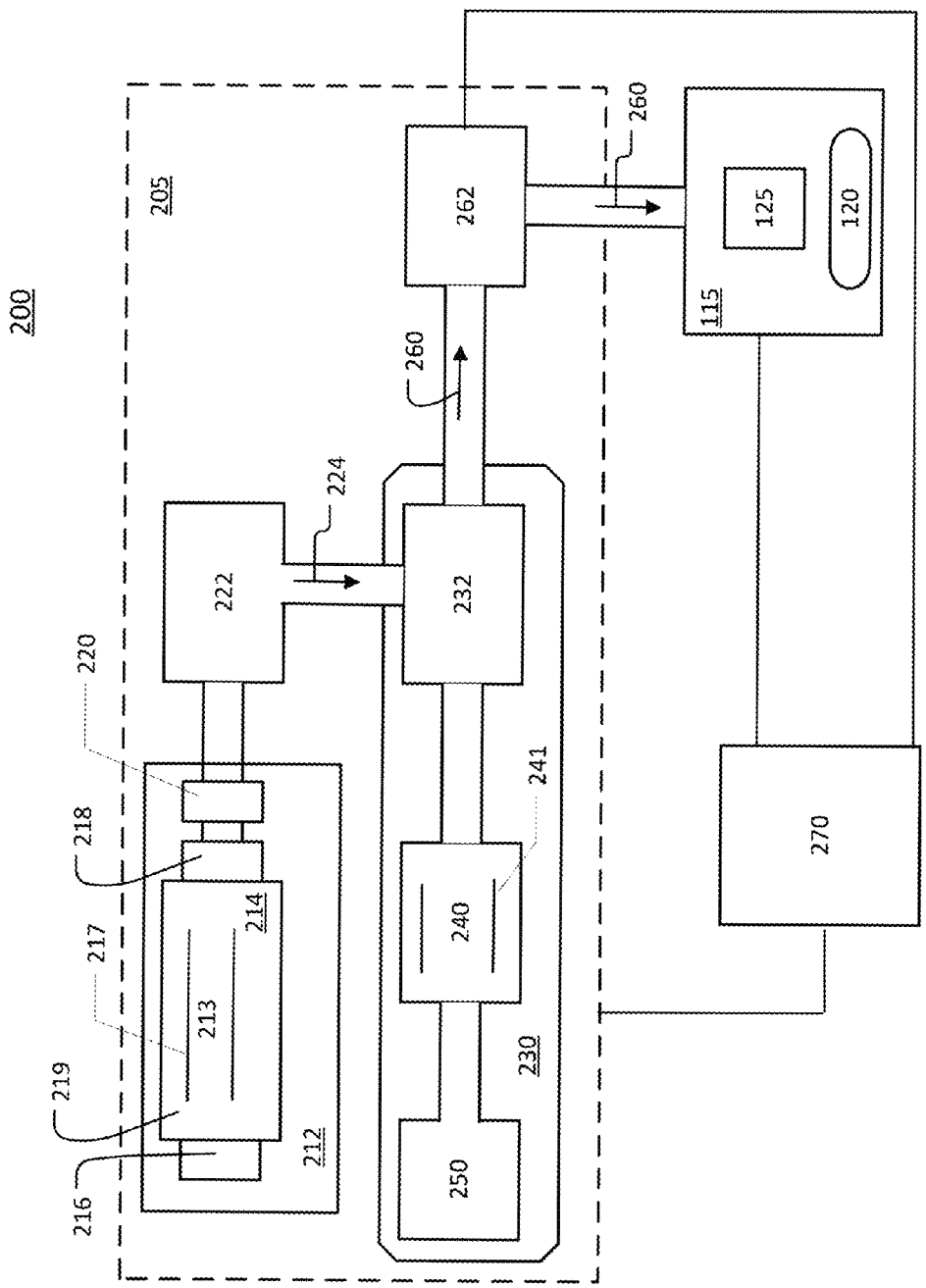
FIG. 2 is a block diagram of another exemplary photolithography system.
Figure 4A:
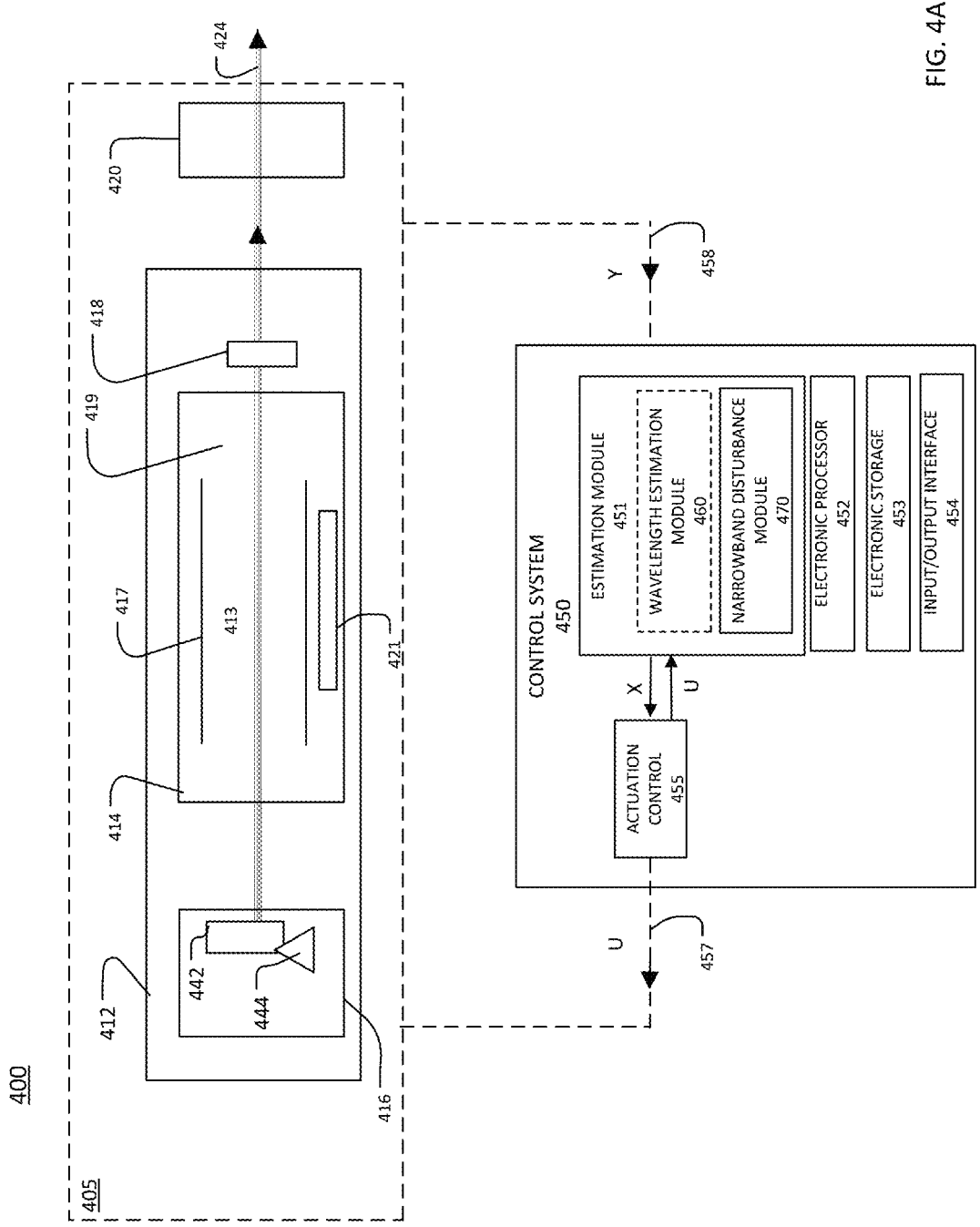
FIG. 4A is a block diagram of an exemplary optical system that includes a light source and a control system.
Figure 4B:
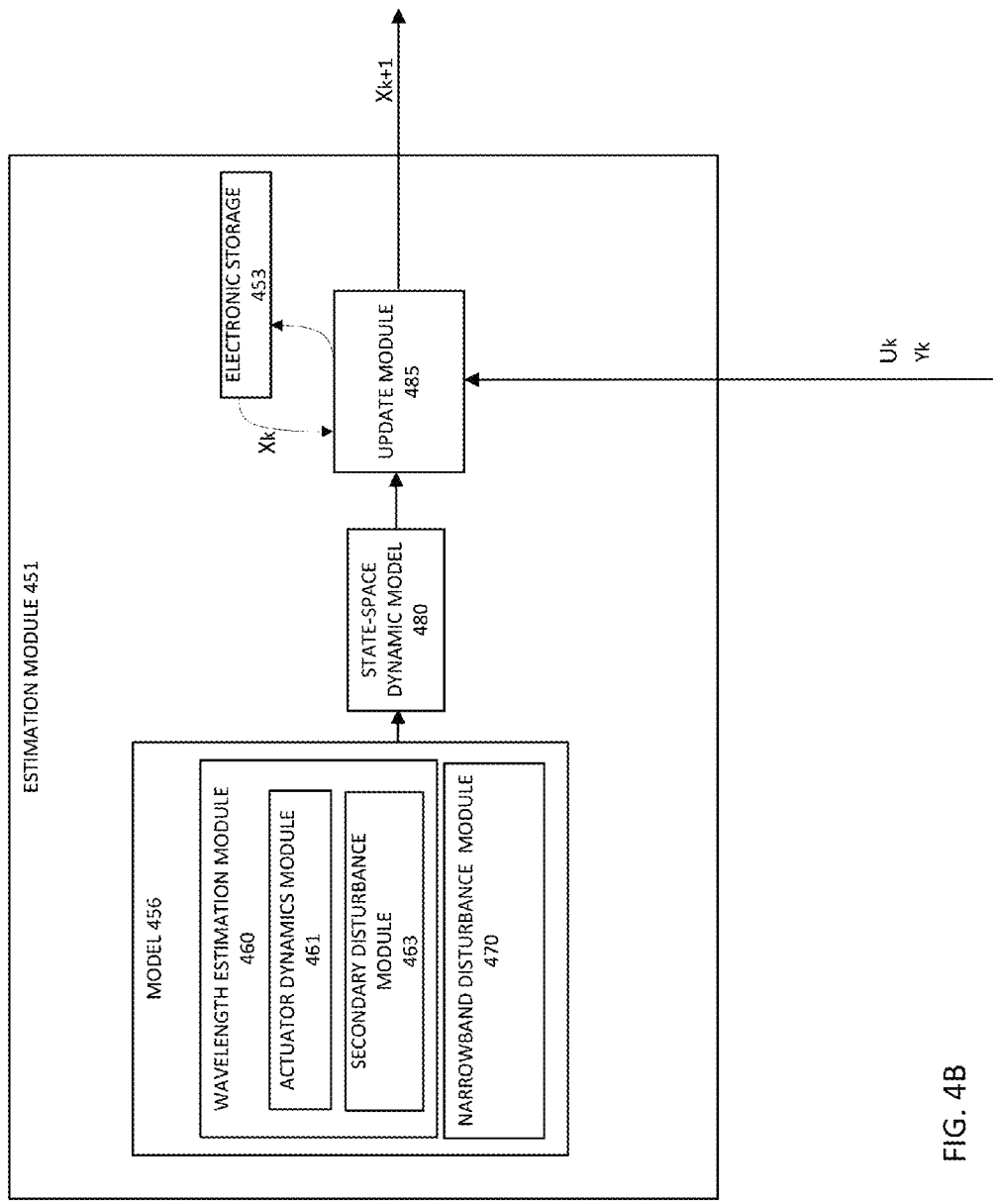
FIG. 4B is a block diagram of an exemplary estimation module that can be used in the control system of FIG. 4A.
Figure 5:
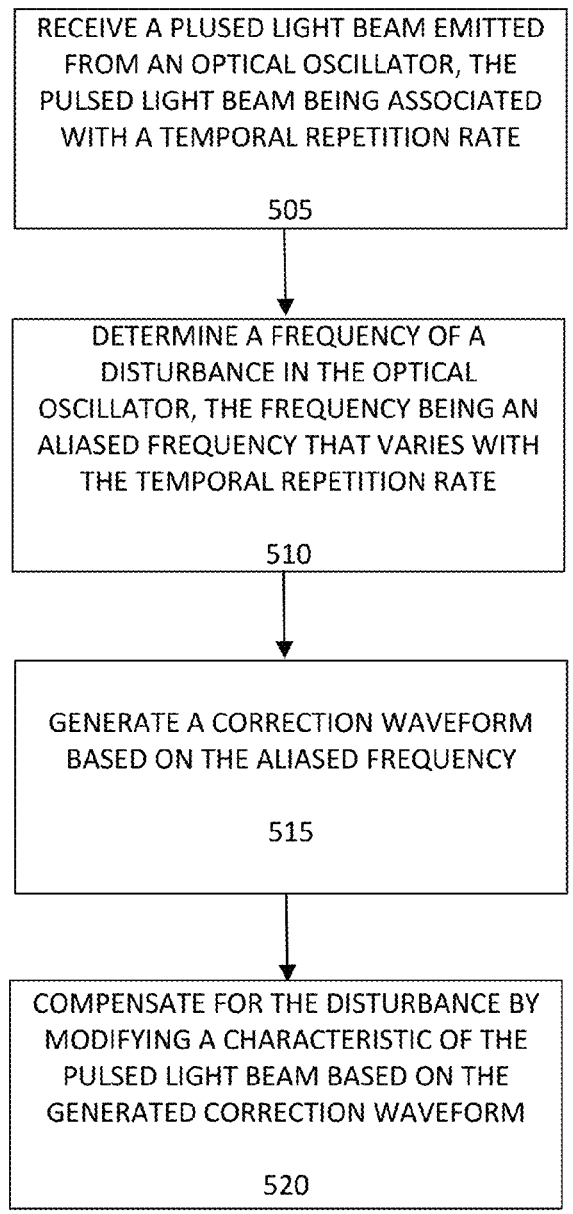
FIG. 5 is a flow chart of an exemplary process for compensating for a narrowband disturbance.

Prior to discussing the correction waveform for countering the effects of the narrowband disturbance in FIGS. 4A, 4B, and 5, an example of the light source 105 is provided with respect to FIG. 2.

Referring also to FIG. 2, an exemplary light source 205 is used as the light source 105 (FIG. 1) in a photolithography system 200. The light source 205 produces a pulsed light beam 260, which is provided to the lithography apparatus 115. The system 200 also includes a control system 270 that is connected to components of the light source 205 as well as to the lithography exposure apparatus 115 to control various operations of the system 200.

The light source 205 can be, for example, an excimer light source that outputs the pulsed light beam 260 (which can be a laser beam). As the pulsed light beam 260 enters the lithography apparatus 115, it is directed through the projection optical system 125 and projected onto the wafer 120. In this way, one or more microelectronic features are patterned onto a photoresist on the wafer 120 that is then etched and cleaned, and the process repeats.

In the example shown in FIG. 2, the light source 205 is a two-stage laser system that includes a master oscillator (MO) 212 that provides a seed light beam 224 to a power amplifier (PA) 230. The master oscillator 212 enables fine tuning of parameters such as the center wavelength and the bandwidth at relatively low output pulse energies, for example, pulse energies of 1 to 1.5 millijoules (mJ) that are amplified by the power amplifier 230 to about 10 to 15 mJ. The power amplifier 230 receives the seed light beam 224 from the master oscillator 212 and amplifies the seed light beam 224 to generate the light beam 260 for use in the lithography apparatus 115.

The master oscillator 212 includes a discharge chamber 214 having two elongated electrodes 217, a gain medium 219 that is a gas mixture, and a fan or blower for circulating gas between the electrodes 217. A resonator is formed between a line narrowing module 216 on one side of the discharge chamber 214 and an output coupler 218 on a second side of the discharge chamber 214. The line narrowing module 216 can include a diffractive optic such as a grating that finely tunes the spectral output of the discharge chamber 214. The master oscillator 212 also includes a line center analysis module 220 that receives an output light beam from the output coupler 218 and a beam modification optical system 222 that modifies the size or shape of the output light beam as needed to form the seed light beam 224. The line center analysis module 220 is a measurement system that can be used to measure or monitor the wavelength of the seed light beam 224. The line center analysis module 220 can be placed at other locations in the light source 205, or it can be placed at the output of the light source 205.

The gas mixture used in the discharge chamber 214 can be any gas suitable for producing a light beam at the wavelength and bandwidth required for the application. For example, for an excimer source, the gas mixture can contains a noble gas (rare gas) such as, for example, argon, krypton, or xenon and a halogen, such as, for example, fluorine or chlorine, apart from helium and/or neon as buffer gas. Specific examples of the gas mixture include argon fluoride (ArF), which emits light at a wavelength of about 193 nm, krypton fluoride (KrF), which emits light at a wavelength of about 248 nm, or xenon chloride (XeCl), which emits light at a wavelength of about 351 nm. The excimer gain medium (the gas mixture) is pumped with short (for example, nanosecond) current pulses in a high-voltage electric discharge by application of a voltage to the elongated electrodes 217.

The power amplifier 230 includes a beam modification optical system 232 that receives the seed light beam 224 from the master oscillator 212 and directs the light beam through a discharge chamber 240, and to a beam turning optical element 252, which modifies or changes the direction of the seed light beam 224 so that it is sent back into the discharge chamber 240. The discharge chamber 240 includes a pair of elongated electrodes 241, a gain medium 249 that is a gas mixture, and a fan for circulating the gas mixture between the electrodes 241.

The output light beam 260 is directed through a bandwidth analysis module 262, where various parameters (such as the bandwidth or the wavelength) of the beam 260 can be measured. The output light beam 260 can also be directed through a pulse stretcher, where each of the pulses of the output light beam 260 is stretched in time, for example, in an optical delay unit, to adjust for performance properties of the light beam that impinges the lithography apparatus 115.

The control system 270 is connected to various components of the light source 205. For example, the control system 270 is coupled to the electrodes 217, 241 within the master oscillator 212 and the power amplifier 230, respectively, for controlling the respective pulse energies of the master oscillator 212 and the power amplifier 230, and also for controlling the pulse repetition rates, which can range between about 500 and 12,000 Hz or greater. The control system 270 therefore provides repetitive triggering of the discharges in the chamber of the master oscillator 212 and the discharges in the chamber of the power amplifier 230 relative to each other with feedback and feed-forward control of the pulse and dose energy. The repetitively-pulsed light beam 260 can have an average output power of between a few watts and hundreds of watts, for example, from about 40 W to about 200 W. The irradiance (that is, the average power per unit area) of the light beam 260 at the output can be at least about 60 W/cm$^2$ or at least about 80 W/cm$^2$.

The output power of the light source 205 can be calculated at 100% duty cycle (that is, the continuous firing of the electrodes in the master oscillator 212 and the power amplifier 230 of the light source 205) at a nominal pulse repetition rate and a nominal pulse energy. Thus, for example, at a nominal pulse repetition rate of 6000 Hz and a 15 mJ nominal pulse energy, the output power of the light source 205 (which is the power of the light beam 260) is 90 W. As another example, at a nominal pulse repetition rate of 6000 Hz and a 20 mJ nominal pulse energy, the output power of the light source 205 (which is the power of the light beam 260) is 120 W.

Additionally, the controller 270 controls when the light source 205 emits a pulse of light or a burst that includes one or more pulses of light by sending one or more signals to the light source 205. The light beam 260 can include one or more bursts that are separated from each other in time. Each burst can include one or more pulses of light. In some implementations, a burst includes hundreds of pulses, for example, 100-400 pulses.

Figure 3:
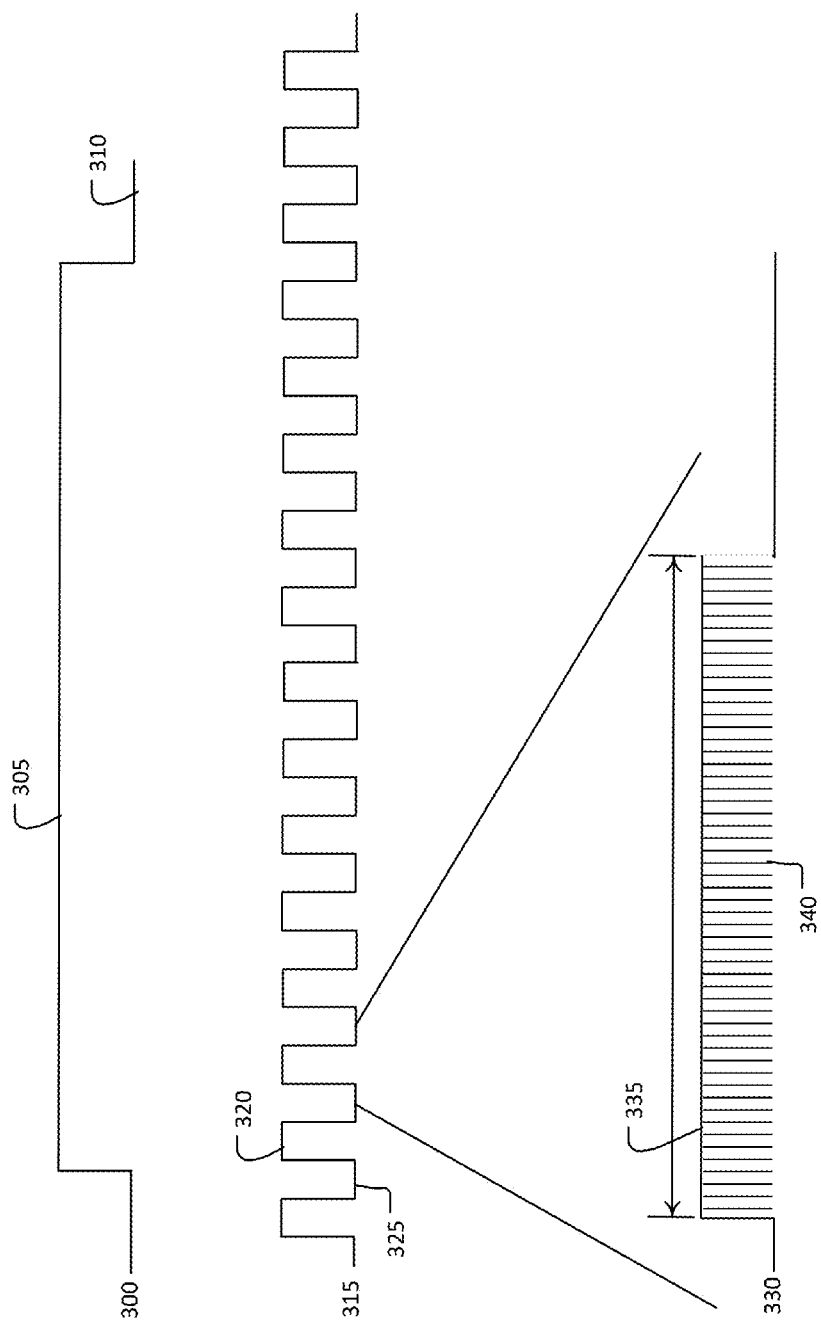
FIG. 3 are traces of exemplary signals that are used to control an optical source that is part of a photolithography system.

Referring also to FIG. 3, the controller 270 can be configured to send a wafer exposure signal 300 to the light source 205 to control the light source 205 to expose the wafer 120 to the light beam 260. The wafer exposure signal 300 can have a high value 305 (for example, 1) while the wafer 120 is being exposed and a low value 310 (for example, 0) when the wafer 120 is not being exposed. Additionally, the controller 270 sends a gate signal 315 to the light source 205. The gate signal 315 has a high value 320 (for example, 1) during a burst of pulses and a low value 325 (for example, 0) during the time between successive bursts. The controller also sends a trigger signal 330 to the light source 205. The trigger signal 330 has a high value 335 (for example, 1) during each pulse of the light source 205 and a low value 340 (for example, 0) for the time between each successive pulse.

As discussed above, when the gain medium 219 is pumped by applying voltage to the electrodes 217, the gain medium 219 emits light. When voltage is applied to the electrodes 217 in pulses, the light emitted from the medium 219 is also pulsed. Thus, the repetition rate of the pulsed light beam 260 is determined by the rate at which voltage is applied to the electrodes 217, with each application of voltage producing a pulse of light. The trigger signal 330, for example, can be used to control the application of voltage to the electrodes 217 and the rate of the pulses. The pulse of light propagates through the gain medium 219 and exits the chamber 214 through the output coupler 218. Thus, a train of pulses is created by periodic, repeated application of voltage to the electrodes 217.

Referring also to FIG. 4A, a block diagram of an exemplary optical system 400 is shown. The optical system 400 includes an optical source 405 (which can be, for example, an excimer laser) and a control system 450. The optical source 405 can be used as the light source 105 in the system 100 or as the master oscillator 211 in the system 200. The control system 450 minimizes or reduces the wavelength error (the deviation from a center wavelength or an otherwise desired wavelength) in a light beam 424 that is produced by the optical source 405 by providing a signal 457 (U) that includes a correction waveform to the optical source 405.

The control system 450 includes a narrowband disturbance module 470 that dynamically estimates disturbance states of the narrowband disturbance based on measured data and produces a correction waveform that reduces or eliminates the effects of the narrowband disturbance based on the estimated states. The estimated disturbance states represent characteristics of the narrowband disturbance. For example, the narrowband disturbance can be represented by a state that includes a value for the magnitude of the disturbance and a state that includes value for phase of the disturbance. The states are estimated prior to each control event. A control event occurs when the control system 450 provides the signal 457 to the optical source 405, with individual control events being index by k in the discussion below. By estimating the disturbance states for each control event, the estimate of the states is dynamic. Thus, the narrowband disturbance module 470 allows for active compensation for a narrowband disturbance that occurs in the optical source 405 even if the characteristics of the narrowband disturbance changes over time. This narrowband disturbance module 470 can be used to compensate for a narrowband disturbance present at any frequency in the spectrum, given prior information about this frequency and ability of the correction waveform to be applied at that frequency by the optical source 405.

In addition to the narrowband disturbance, various other disturbances and physical effects that occur in the optical source 405 can contribute to the wavelength error. For example, the wavelength error can be caused by the position of an optical element 442 that interacts with light in the optical source 405, drift, or transient effects. In some implementations, the control system 450 also includes a wavelength estimation module 460 that accounts for effects other than the narrowband disturbance. In these implementations, the control system 450 produces an output that reduces the effects of the narrowband disturbance and also provides additional compensation.

The optical source 405 includes an oscillator 412 that includes a discharge chamber 414 having two elongated electrodes 417, a gain medium 419 that is a gas mixture, and a fan (or blower) 421 for circulating the gain medium 419. In the example of FIG. 4A, the fan 421 is positioned under one of the electrodes 417. However, other locations are possible. For example, the fan 421 can be placed above one of the electrodes 417. The fan 421 can be placed in any location that allows the fan 421 to circulate the gain medium 419 in the chamber 414.

Figure 4C:
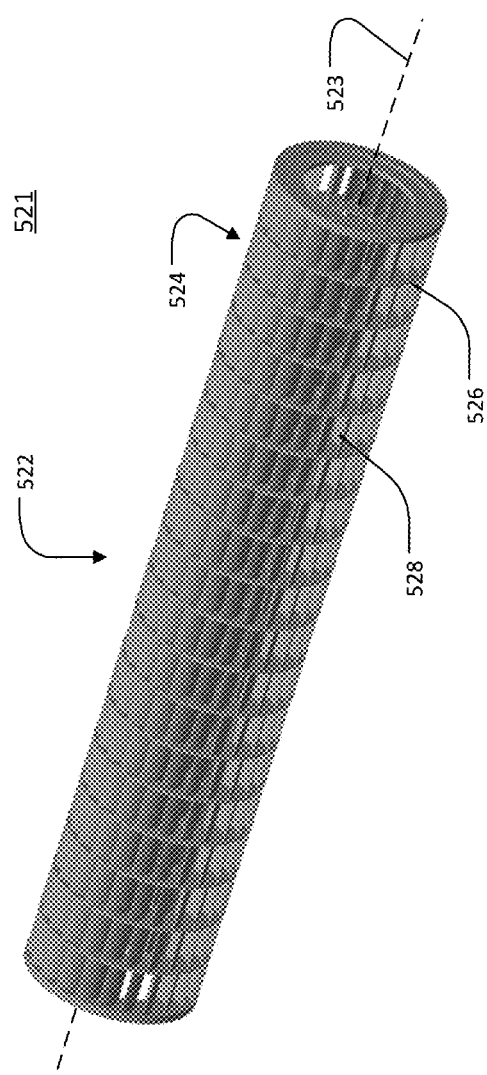
FIG. 4C is a perspective view of an exemplary fan that can be used in the light source of FIG. 4A.
Figure 4D:
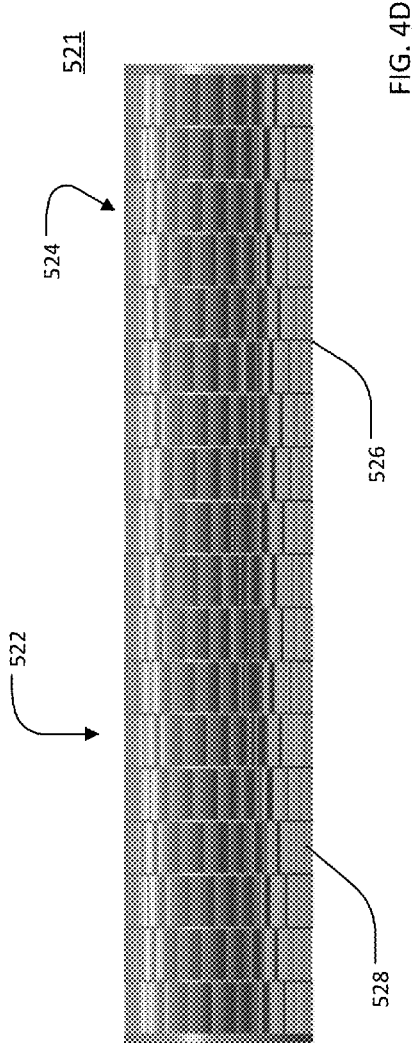
FIG. 4D is a side view of the exemplary fan of FIG. 4C.

In some implementations, the fan 421 includes a plurality of blades circumferentially present on the surface, and the blades rotate about the center in a periodic or regular fashion. An example of such an implementation is shown in FIG. 4C, which shows a perspective view of a fan 521 that can be used as the fan 421, and FIG. 4D, which shows a perspective side view of the fan 521. The fan 521 is a rotary fan that rotates about a longitudinal axis 523. The fan 521 includes an outer portion 522, which has a plurality of sections 524, each of which are separated by a bulkhead 526. The exemplary fan 521 includes eighteen (18) sections, but other numbers of sections can be used. Each section 524 has a plurality of blades 528. The blades 528 can be arranged in a variety of ways and can have a variety of shapes. For example, the blades 528 can have a helical shape. Additionally, the sections 524 can have the same number of blades, or the number of blades can differ among the plurality of sections. The blades can be arranged in an ordered fashion or can be in random positions. The exemplary fan 521 of FIGS. 4C and 4D has the blades 528 arranged in a double chevron or double helical fan blade arrangement. When the fan 521 is used as the fan 421, this arrangement of the blades 528 can reduce the acoustic impact that the rotation of the fan 521 has on, for example the gain medium 419. Another example implementation of the fan is disclosed in U.S. Pat. No. 8,855,166 and shown and discussed, for example, with respect to FIGS. 13-18 of U.S. Pat. No. 8,855,166.

Acoustic waves produced during the firing of the electrodes 417 can reflect off of the moving blades of the fan 421 (the blades 524 when the fan 421 is implemented as the fan 521) and can create variations in the density of the gain medium 419 at the frequency of blade rotation and its higher order harmonics. The variations in the medium 419 can deflect the light that propagates in the discharge chamber 414, thereby changing the wavelength of the light and giving rise to wavelength error.

A resonator is formed between a line narrowing module 416 on one side of the discharge chamber 414 and an output coupler 418 on a second side of the discharge chamber 414. When a voltage is applied to the electrodes 417, the gain medium 419 emits light that propagates in the resonator along a beam path 413 to form the pulsed light beam 424. The line narrowing module 416 includes an optical element 442 that interacts with the light that propagates in the resonator by, for example, reflecting and/or refracting the light. The optical element 442 can be a diffractive optic such as a grating that finely tunes the spectral output of the light beam 424. In some implementations, the optical element 442 is a reflective element that disperses light based on the wavelength of the light, such as a prism. The optical element 442 can have both refractive and reflective components. The optical element 442 can be a collection of optical elements, some of which are refractive and some of which are reflective, or all of which are the same type of element.

The optical element 442 is coupled to an actuator 444 that is controllable to move or modify the shape of the optical element 442. The actuator 444 can be any type of actuator that is capable of causing the optical element 442 to move or to change shape. For example, the actuator 444 can be a piezoelectric transducer (PZT) that changes shape and/or size in response to application of a voltage. In this example, applying a voltage to change the shape of the actuator 444 causes the optical element 442 to move. The optical element 442 can be coupled to the actuator 444 through direct or indirect physical contact. For example, the actuator 444 can touch the optical element 442 or an element (such as a mount) that touches the optical element 442. In some implementations, the actuator 444 causes the optical element 442 to move without making physical contact.

The optical source 405 also includes a line center analysis module 420 that receives an output light beam from the output coupler 418 to form the pulsed light beam 424. The line center analysis module 420 is a measurement system that monitors and/or measures the wavelength of the pulses of the pulsed light beam 424. In some implementations, the line center analysis module 420 measures the wavelength of each pulse in the pulsed light beam 424 and provides the wavelength measurement to the control system 450 via a signal Y (458). The wavelength measurement can be a wavelength error that represents the difference between the measured wavelength and the center wavelength. A wavelength measurement is provided at the temporal repetition rate of the pulsed light beam 424. The temporal repetition rate of the pulsed light beam 424 can be different than the rate at which control events occur.

The system 400 also includes the control system 450. The control system 450 receives data and/or signals from the line center analysis module 420, such as data provided by the signal 458 that indicates the wavelength of one or more pulses in the pulsed light beam or the temporal repetition rate of the pulsed light beam 424. This data is received at the control system at the temporal repetition rate of the light beam 424.

The control system 450 includes an estimation module 451 and an actuation control 455. The estimation module 451 estimates disturbance states, represented as a time-varying array X, that affect wavelength as well as the states of components in the optical source 405 (such as the optical element 442) and provides the estimates to the actuation control 455. Based on the estimated states, the actuation control 455 determines a signal, U (457), that when applied to the optical source 405, causes the actuator 444 to move in a manner that compensates for the narrowband disturbance predicted to be present in the optical source 405. The signal 457 can represent an amount of change relative to a signal that is currently applied or was recently applied.

The narrowband disturbance module 470 estimates states of the narrowband disturbance, and the estimated states are contained in X. In some implementations, the narrowband disturbance can be modeled with two disturbance states, a state ($x^i$) for an in-phase component and a state ($x^q$) for a quadrature component. The sum of the in-phase and quadrature components, when added vectorially, results in a waveform that represents the narrowband disturbance. In this way, determining the states X, which contains the characterization of the narrowband disturbance, allows the actuation control 455 to generate a correction signal that counteracts the narrowband disturbance, among other disturbances and effects.

The states for the narrowband disturbance in the chamber 414 when the next control event (k+1), which is the control event immediately after the current control event, k, occurs can be estimated with a quadrature oscillator model having the form shown in Equation (1):

$$\begin{bmatrix} x^i \\ x^q \end{bmatrix}_{k+1} = \begin{bmatrix} \cos(\omega T_p) & \sin(\omega T_p) \\ -\sin(\omega T_p) & \cos(\omega T_p) \end{bmatrix} \begin{bmatrix} x^i \\ x^q \end{bmatrix}_k + \begin{bmatrix} 1 & 0 \\ 0 & 1 \end{bmatrix} \begin{bmatrix} w^i \\ w^q \end{bmatrix}_k, \quad (1)$$

where $T_p$ is the prediction period, w is a noise component, k indexes the control events (the providing of the signal 457 to the optical source 405), and ω is the frequency of the narrowband disturbance (which can be an aliased frequency) in radians per second. A control event can occur with a frequency of, for example, 6250 Hz (with a control even occurring every 0.16 milliseconds). The prediction period $T_p$ is the time between estimates of the states X and may equal or be greater than the inverse of the frequency at which a control event occurs. Hence, there may be more predictions than there are control events.

The frequency (ω) of the narrowband disturbance depends on the speed of the component that gives rise to the disturbance, the design of that component, and/or the temporal repetition rate. For example, when the narrowband disturbance arises from the fan 421, Equation (2) provides the frequency of the narrowband disturbance:

$$\omega = \left| h * b * \frac{\text{fan speed (rpm)}}{60} - \text{temporal repetition rate (Hz)} \right|, \quad (2)$$

where ω is the aliased frequency of the narrowband disturbance in Hz, h is an integer number of one (1) or greater that represents the harmonic (with h=1 representing the fundamental frequency), and b is an integer number that represents the number of circumferential blades on the fan 421.

Using ω resulting from Equation (2) in Equation (1) (with appropriate conversion of units) leads to an estimate of the value of the states of the narrowband disturbance (contained in X) that is predicted to be present in the optical source 405 when the next control event (k+1) occurs. The magnitude of a waveform that would have these two estimated states can be determined from Equation 3:

$$\text{magnitude} = \sqrt{(x^i)^2 + (x^q)^2} \quad (3).$$

The phase of the waveform that would have these two states can be determined from Equation (4)

$$\text{phase} = \tan^{-1}\left(\frac{x^q}{x^i}\right). \quad (4)$$

Thus, from Equations (3) and (4), a correction waveform having a magnitude that is the same as the narrowband disturbance and a phase that is different can be determined. The data that represents the correction waveform can be, for example, a sinusoidal voltage signal that has a frequency and magnitude equal to those estimated or determined for the narrowband disturbance and a phase that is 180° out of phase with the estimated phase of the narrowband disturbance. Additionally, a correction waveform can be determined for any number of the harmonics of the narrowband disturbance.

In some implementations, the estimation module 451 also includes the wavelength estimation module 460 that models disturbances and system variability other than those modeled by the narrowband disturbance module 470. An example of such an implementation is shown in FIG. 4B, which is a block diagram of an implementation of the estimation module 451 with a model 456 that includes both the wavelength estimation module 460 and the narrowband disturbance module 470.

The wavelength estimation module 460 includes an actuator dynamics module 461, and a secondary disturbance module 463. The, the actuator dynamics module 461 provides a model of the behavior of the optical element 442 and/or the actuator 444. This model can be used to make periodic predictions of the state of the optical element 442 and/or the actuator 444. The state of the optical element 442 can include, for example, one or more values that represent the position and/or velocity of the optical element 442.

The actuator dynamics module 461 provides a model of the physical movement or action of the actuator 444 in response to application of an input to the actuator 444. For example, in instances in which the actuator 444 is a PZT, the actuator dynamics module 461 models the actuator 444 as a second-order system. The state of the actuator 444 can be any quantity or quality associated with the actuator 444 that can vary with time. For example, the state can be a voltage that is applied to the actuator 444. The state of the actuator 444 can include more than one quantity or quality. For example, the state of the actuator can be a current position, and a current velocity of the actuator in one or more dimensions and the voltage that was most recently applied to the actuator 444. The secondary disturbance module 463 models well understood disturbances in the optical source 405 other than the narrowband disturbance. For example, the secondary disturbance module 463 can model wavelength drift with time.

In the estimation module 451, the output of the wavelength estimation module 460 is used in or with the output of the narrowband disturbance module 470 to form a state-space dynamic model 480. This state-space model 480 include matrices A and B, with the elements of the matrix A and the matrix B including the narrowband disturbance module 470 and the wavelength estimation module 460. The matrices A and B are provided to the update module 485, which predicts or estimates the state array X for the next control event (k+1) based on the value of $X_k$ and actuation signal $U_k$ at current control event. Using Equations (5), an estimate of the state $X_{k+1}$ can be obtained from:

$$X_{k+1} = AX_k BU_k \quad (5)$$

where k indexes the control events (with k being the current control event and k+1 being the next or immediately subsequent event), and U represents the control signal 457 determined by the actuation control 455. Thus, $X_k$ is a current state of one or more components or conditions in the optical source 405, $U_k$ is the most recently applied or the current output from the actuation control 455 (signal 457). The previous values of $X_k$ are stored in and can be obtained from the electronic storage 453, and the values of $U_k$ can be obtained from the actuation control 455. Thus, $X_{k+1}$ can be determined from Equation (5).

The method as shown above is based on a priori information, such as information included in the model 456 and the state-space dynamic model 480, known about the optical source 405. However, this a priori information, assumed to be accurate information about the optical source 405, may not be perfectly accurate due to variation between systems or other uncaptured information. The second function of the update module 485 is to use the previous wavelength measurement received from the line center analysis module 420 via the signal 458 to update the state estimate $X_k$ to be closer to reality, producing an updated measurement, $\tilde{X}_k$, which is based on measured data. This measurement update may be performed, for example, using a Kalman filter. This allows the control system 450 to change the magnitude and/or phase of the narrowband disturbance, should the magnitude and/or phase of the narrowband disturbance change with time. Then an estimate of the state $X_{k+1}$ can be obtained from equations (6) as:

$$X_{k+1} = A\tilde{X}_k + BU_k \qquad (6)$$

After $X_{k+1}$ is determined, the estimation module 451 provides $X_{k+1}$ to the actuation control 455. The actuation control 455 determines the signal 457, U, that if provided to the optical source 405 at the next control event (k+1), would act on the optical source 405 and/or a component of the optical source 405 to achieve the wavelength close to the desired wavelength of the light beam 424, while satisfying certain constraints. This desired wavelength can be, for example, the center wavelength. The determination of the signal 457 may include, for example, optimizing the value of U (the signal provided to the optical source 405) to minimize the wavelength error in view of the values included in X, accounting for constraints. An example of a constraint used in the optimization can be that the absolute value of U be less than a threshold value. For example, U can represent a voltage or current that is applied to the actuator 444 to move the optical element 442. A constrain that prohibits large values of U can prevent the application of large currents or voltages to the actuator. Additionally, large values of U in this example may indicate an error that arises from something other than a narrowband disturbance. The optimization can be implemented as, for example, a linear quadratic regulator (LQR). The output of actuation control 455 may be an incremental change to U that is then added linearly to the present value of $U_k$.

Thus the actuation control 455 determines the next value control signal 457 or the incremental change in the control signal 457 (either of which is represented in this example by $U_{k+1}$) and provides that control signal 457 to the optical source 405. Because $U_{k+1}$ is determined from $X_{k+1}$ (which are states of components and/or conditions that are causes of wavelength error) and $U_k$ (the previously applied value of control signal 457), application of the signal including $U_{k+1}$ to the optical source 405 results in a beam that has a wavelength that is closer to the center wavelength and, thus, has a reduced wavelength error. Additionally, because the estimation module 451 includes the narrowband disturbance module 470, $U_{k+1}$ also includes the correction waveform that reduces or eliminates the narrowband disturbance.

The control system 450 also includes an electronic processor 452, an electronic storage 453, and an input/output (I/O) interface 454. The electronic processor 452 includes one or more processors suitable for the execution of a computer program such as a general or special purpose microprocessor, and any one or more processors of any kind of digital computer. Generally, a processor receives instructions and data from a read-only memory or a random access memory or both. The electronic processor 452 can be any type of electronic processor.

The electronic storage 453 can be volatile memory, such as RAM, or non-volatile memory. In some implementations, and the electronic storage 453 can include both non-volatile and volatile portions or components. The electronic storage 453 stores instructions, perhaps as a computer program, that, when executed, cause the processor 452 to communicate with other components in the control system 450 and/or the optical source 405. For example, the instructions can be instructions to cause the electronic storage 453 to store data related to the wavelength of the pulses in the pulsed light beam 424. The instructions can be instructions that cause the electronic processor 452 to analyze the stored data and generate a voltage signal based on the stored data.

The I/O interface 454 is any kind of electronic interface that allows the control system 450 to receive and/or provide data and signals with an operator, the optical source 405, and/or an automated process running on another electronic device. For example, the I/O interface 454 can include one or more of a visual display, a keyboard, or a communications interface.

Referring to FIG. 5, a flowchart of an exemplary process 500 is shown. The process 500 actively compensates for and/or rejects a narrowband disturbance.

The process 500 is discussed with reference to the control system 450 and the optical source 405 shown in FIGS. 4A and 4B. However, other implementations are possible. For example, the process 500 can be performed by one or more electronic processors in the control system 170 or 270. In some implementations, the process 500 is performed by electronic processors that are distributed within the optical source 405 and/or outside of the optical source 405. Furthermore, the process 500 can be implemented as machine-readable and executable instructions capable of being stored on a computer-readable medium, such that the process 500 can be installed onto an existing control system for a light source as an upgrade or retrofit. For example, the process 500 can be installed as a software update to add additional functionality a control system that already includes a module such as the wavelength estimation module 460.

A pulsed light beam is received (505). The pulsed light beam is emitted from the oscillator 412 and has a temporal repetition rate. The temporal repetition rate is the time between two successive pulses of light in the pulsed light beam. The temporal repetition rate can be, for example, greater than 500 Hz, between 500 and 6,000 Hz, between 5,990 Hz and 6,000 Hz, or greater than 6,000 Hz.

The light beam can be received at the line center analysis module 420 or another module that measures, monitors, or determines a characteristic, such as the wavelength, of the pulsed light beam. The light beam can be the pulsed light beam 424. In other examples, the light beam can be a pulsed laser beam produced by an excimer laser, an amplified pulsed light beam, or a pulsed light beam from an optical source that is not a laser.

The light beam is associated with a center wavelength. A signal 458, which represents the wavelength of the light beam, is provided to the control system 450. An instance of the signal 458 can be provided each time a pulse of light is received. Thus, the control system 450 can receive an updated signal 458 at a frequency that is equal to the frequency at which pulses are received at the line center analysis module 420.

The light beam is associated with a nominal or center wavelength at which the optical source 405 is expected to produce light. The light beam can deviate from the center wavelength due to disturbances in the chamber 414. For example, a narrowband disturbance can occur in the optical oscillator 412 or any of the components of the optical source 405. The narrowband disturbance is a disturbance that is only present at a single or small band of frequencies relative to the entire spectrum. The magnitude of the narrowband disturbance signifies the effect of the disturbance on the wavelength. The narrowband disturbance in the optical source 405 may contain a plurality of narrowband disturbances, each occurring at a separate and distinct frequency, or within separate and distinct bands of frequencies, and having different magnitudes. Each narrowband disturbance creates density differences in the beam path at the frequency of the disturbance in the gain medium 419. This can affect the propagation of light in the oscillator 412 by, for example, deflecting the light and changing the angle at which it enters the line narrowing module 416, therefore, changing the wavelength of the light, thereby increasing the wavelength error.

A frequency of the narrowband disturbance in the oscillator is determined (510). Although the physical manifestation of the narrowband disturbance can have a frequency that is fixed in time, the frequency of the disturbance, as measured from the wavelength error, can appear as an aliased frequency that varies with the temporal repetition rate of the pulsed light beam. Light that travels along the beam path 413 in the chamber 414 has pulses that occur with a frequency that is equal to the repetition rate of the light beam. In this way, the light propagating on the beam path 413 samples the fundamental and harmonic frequencies of the narrowband disturbance at the temporal repetition rate. If the fundamental and/or harmonic frequencies are greater than half of the repetition rate, the fundamental and/or harmonic frequencies are aliased due to the limited sampling rate.

The respective frequencies to which the fundamental and harmonic frequencies are aliased depends on the temporal repetition rate of the light beam (the sampling rate), and the aliased frequency can be determined based on the temporal repetition rate. For example, the aliased frequency can be determined from a mathematical relationship between the actual disturbance frequency and the temporal repetition rate. Equation 2 (reproduced again below and discussed above with respect to FIGS. 4A and 4B) shows an example of an equation that can be used to determine an aliased frequency associated with the narrowband disturbance caused by the fan 421:

$$\omega = \left| h*b* \frac{\text{fan speed (rpm)}}{60} - \text{temporal repetition rate (Hz)} \right|. \quad (2)$$

The frequency of the narrowband disturbance can be determined from other equations that depend on temporal repetition rate, system design details, and/or the frequency at which a component in the optical source 405 moves.

Figure 6:
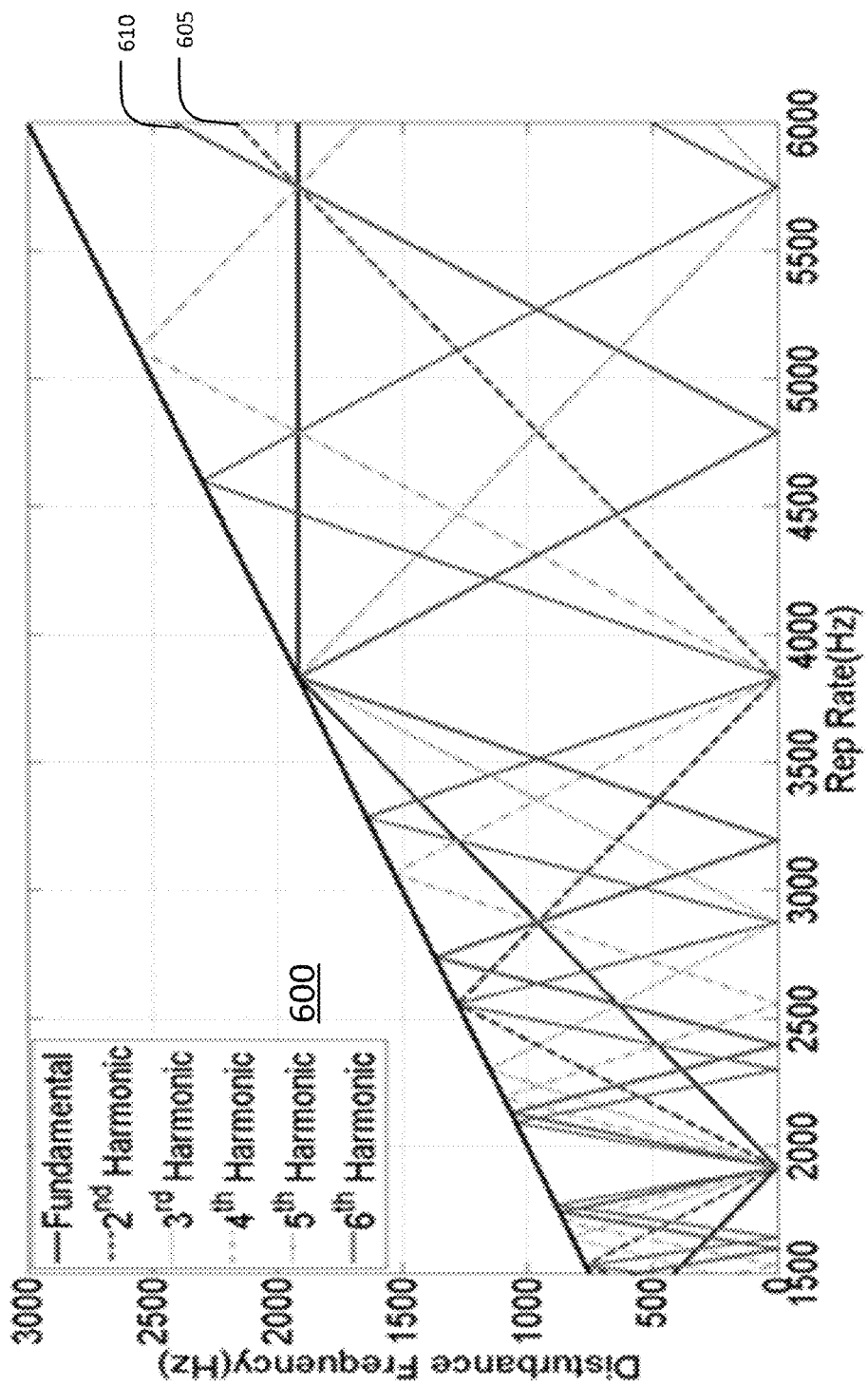
FIG. 6 is an exemplary frequency map that plots aliased frequency as a function of repetition rate for various harmonics of a narrowband disturbance.

In some implementations, an equation such as Equation 2 and/or observed data can be used to generate a frequency map 600 that relates an aliased frequency of the narrowband disturbance to the temporal repetition rate of the light beam 424. The frequency map 600 can be used to determine the aliased value of the frequency (fundamental and/or harmonics) of the narrowband disturbance. Referring also to FIG. 6, an exemplary frequency map 600 that plots aliased frequency (Hz) as a function of temporal repetition rate of the light beam is shown.

The data shown on the frequency map 600 was estimated for a blower (fan) having twenty-three (23) blades and rotating at a speed of 5,000 rpm. The fundamental frequencies (Hz) and the frequency (Hz) of the harmonics of the fundamental frequency, each representing a narrowband acoustic disturbance caused by the fan, depend on the geometry of the fan and its rotation speed and are given by Equation (7):

$$f = h*b*(\text{rotation speed (rpm)})/60, \quad (7)$$

where h is the harmonic (an integer of 1 or greater), and b is the number of blades in the fan. Other sources of narrowband acoustic disturbances can be expressed with an equation that accounts for the design, geometry, and motion of the component that produces the disturbance.

The frequencies of the narrowband disturbance modeled to produce the frequency map 600 are aliased from the values f given by Equation 7. As shown by Equation 7, without aliasing, the fundamental and harmonic frequencies of the narrowband disturbance are fixed and do not depend on the temporal repetition rate. The presence of aliasing is apparent from FIG. 6, which shows the frequencies' dependence on the temporal repetition rate of the light beam.

Additionally, at some temporal repetition rates, the aliased harmonics intersect, indicating that different harmonics are aliased to the same frequency. In the frequency map 600 this occurs at many temporal repetition rates, including, for example, 3,500 Hz. For an optical source producing a pulsed light beam with a temporal repetition rate of 3,500 Hz, the frequency map 600 indicates that the frequencies of the fifth ($5^{th}$) and sixth ($6^{th}$) harmonics are both aliased to 1,000 Hz.

The temporal repetition rate of the light beam is known or can be determined during the operation of the optical source 405 from the pattern of the voltage that is applied to the electrodes 417. Using the known temporal repetition rate, the frequencies of the narrowband disturbance can be determined from the frequency map 600. For example, for a temporal repetition rate of 6,000 Hz, the frequency map 600 shows that the second harmonic (which has an un-aliased frequency of 3,833 Hz) is aliased to a frequency of about 2,166 Hz (shown on the frequency map 600 with the label 605). The fifth harmonic of the disturbance (which has an un-aliased value of 9,585 Hz) is aliased to a frequency of 2,415 Hz (shown on the frequency map 600 with the label 610).

Thus, the frequency or frequencies associated with the narrowband disturbance can be determined from the frequency map 600. The frequency map 600 can be implemented graphically, as shown in the example of FIG. 6. In some implementations, the frequency map can be expressed as a collection of numerical values that are stored in a look-up table. In some implementations, the frequency (or frequencies) of the narrowband disturbance is received as an input from an operator or an automated process.

Figure 7:
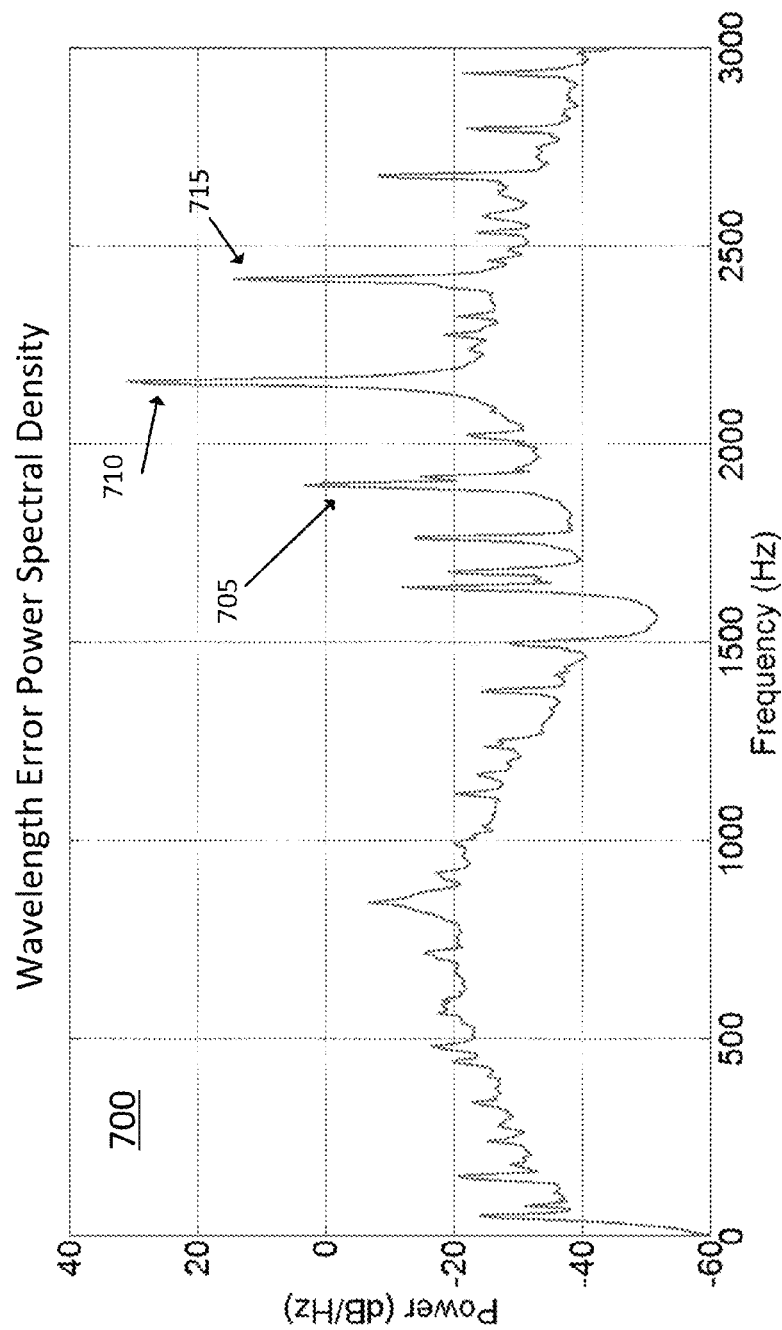
FIGS. 7 and 8 are exemplary plots of power spectral density of wavelength error.

The frequency or frequencies of the narrowband disturbance can be determined in other ways. For example, the frequency of the narrowband disturbance can be determined from the power spectral density (PSD) of the wavelength error. Referring also to FIG. 7, an example of the single-sided power spectral density of the wavelength error (decibel/Hz) as a function of frequency (Hz) based on measured wavelength error is shown. The power spectral density was determined by taking a 1024-point Fast Fourier transform (FFT) of wavelength error data as a function of time and calculating magnitudes of the FFT. The wavelength error data includes a wavelength error for each pulse in a collection of several hundred or thousands of pulses in the light beam.

In the example shown in FIG. 7, the temporal repetition rate of the light beam was 6,000 Hz, and the fan 421 included twenty-three (23) blades that were rotating at 5,000 rpm. The value peaks 705, 710, and 715 show the power of the contribution of the fundamental, second, and fifth harmonics, respectively, of the narrowband disturbance caused by the fan 421. In this example, a spike in the power spectral density represents a narrowband disturbance and occurs at fundamental frequency of the motion of the fan 421, with additional peaks occurring at the frequencies corresponding to the harmonics of the fundamental frequency. Other physical effects, such as vibrations from components other than the fan 421, can give rise to a narrowband disturbance in the optical source 405. Regardless of its cause, the narrowband disturbance causes a spike (an increase in power concentrated at a single frequency or over a band containing a few frequencies) in the power spectral density of the wavelength error at the frequency or frequencies of the disturbance and a corresponding increase in wavelength sigma.

In some implementations, the PSD of the wavelength error (such as the PSD 700) can be analyzed, perhaps by an automated, electronic process, to identify peaks (maxima of the PSD) that indicate the presence of a narrowband disturbance at those frequencies. The frequency or frequencies at which the peaks occur and can used in narrowband disturbance module 470 and state space model 480 to determine states X of the narrowband disturbance using Equation 1.

Returning to FIG. 5, a correction waveform is generated based on the aliased frequency (515). The correction waveform can be based on states, the vector sum of which represents the narrowband disturbance that is predicted to be present in the chamber when the correction waveform is applied to the optical source 405. As discussed above with respect to Equation 1, the estimation of the states is based on the frequency of the narrowband disturbance, which can be an aliased frequency. The disturbance states can include an in-phase component and a quadrature component. In some implementations, one of the disturbance states represents a magnitude of the narrowband disturbance and another of the disturbance states represents a phase of the narrowband disturbance.

The estimate of the disturbance states can be dynamically updated at a rate that is greater than or equal to the temporal repetition rate of the light beam. In this manner, the estimates of the disturbance states account for changes that occur during operation of the optical source 405.

The correction waveform has the same frequency and magnitude as the estimated narrowband disturbance and a different phase than the narrowband disturbance. Thus, the correction waveform acts to cancel or reduce the narrowband disturbance. In some implementations, the correction waveform has a phase that is 180° opposite to the phase of the narrowband disturbance.

In addition to including information about the narrowband disturbance, in some implementations, the correction waveform also includes information about other disturbances and conditions in the optical source 405 that can cause wavelength error. In these implementations, the wavelength estimation module 460 can be used to determine states that represent these conditions and additional disturbances. In these implementations, the process 500 compensates for the narrowband disturbance and additional sources of wavelength error.

The correction waveform can take any form so long as the correction waveform, or a signal derived from the correction waveform, has information sufficient to cause the optical source 405 or a component in the optical source 405 to react in a manner that compensates for the narrowband disturbance (and possibly other disturbances) in response to application of the correction waveform. For example, the correction waveform can be a voltage signal that includes sinusoidal waves at the one or more frequencies at which the narrowband disturbance occurs in addition to a voltage signal that compensates for additional disturbances. Applying the correction waveform to the optical source 405 can cause the actuator 444 and the optical element 442 to move. In some implementations, the correction waveform is a collection of digital signals that are converted into one or more analog voltage correction waveforms through further electronic processing. Additionally, in some implementations, the correction waveform is a waveform that represents the change (or delta) as compared to the previous waveform.

The narrowband disturbance is compensated by modifying a characteristic of the pulsed light beam based on the generated correction waveform (520). The characteristic of the pulsed light beam 424 can be, for example, a wavelength of the light beam 424. The narrowband disturbance can include, for example, a plurality of harmonics of a fundamental frequency. The correction waveform can be, for example, a voltage signal that includes a sinusoid at the fundamental frequency and each of the harmonics, with a phase that is different (for example, opposite) to the phase of the narrowband disturbance at each of the frequencies. The voltage signal can be applied to the actuator 444 to cause the optical element 442 to move in such a way that the light that propagates in the chamber 414 is deflected in a way that counters the deflection that would be caused by the narrowband disturbance. By moving the optical element 442 in this manner, the frequency of the beam 424 remains at or becomes closer to the center wavelength, thus reducing the wavelength error as well as reducing the contribution to wavelength error at the frequencies associated with the narrowband disturbance.

Figure 8:
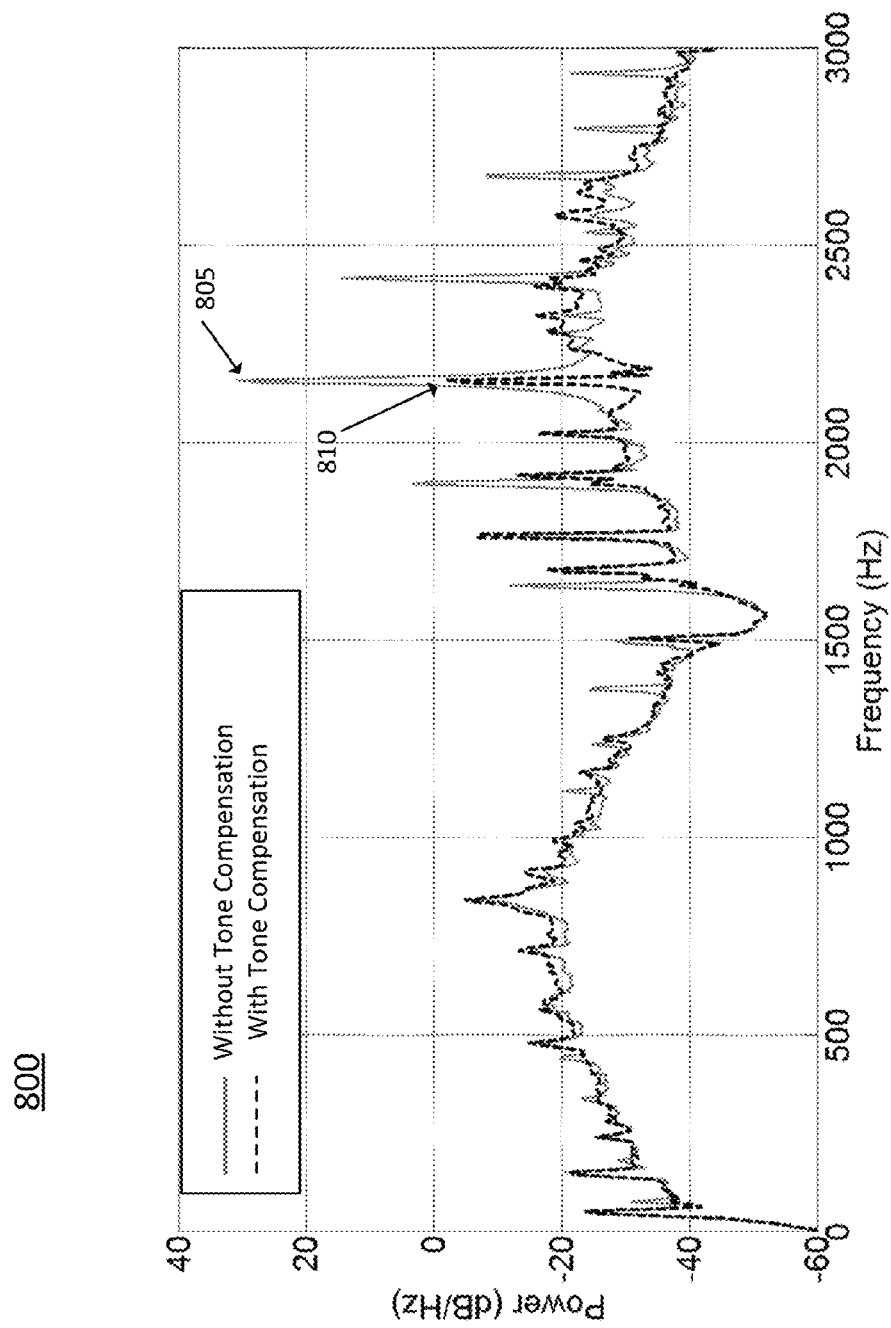

Referring to FIG. 8, curves 805 and 810 show exemplary power spectral densities of wavelength error. The curve 805, shown with a solid line and marked as "Without Tone Compensation" in the key, represents a PSD of wavelength error without active compensation for narrowband disturbances. The curve 810, shown with a dashed line and marked as "With Tone Compensation" in the key, represents a PSD formed from wavelength error data collected under the same conditions but after compensation for a narrowband disturbance using a process such as the process 500 discussed above.

The wavelength error data collected to produce the curve 805 and the curve 810 was collected from 150 bursts of pulses (with each burst including hundreds of pulses) from an excimer laser with a temporal repetition rate of 5,995 Hz, a chamber temperature of 65° C., and a 23-blade blower (fan) rotating at a speed of 5,000 rpm. In this configuration, the blower has a second harmonic at 3,833 Hz which gets aliased at 2,157 Hz. In this example, the disturbance caused by the second harmonic makes the largest contribution to the wavelength error. As shown, application of compensation for the narrowband disturbance decreased the magnitude of the contribution of the second harmonic to the wavelength error by more than 20 decibels (dB). The reduction in the relative contribution at the frequency of the second harmonic reduces the standard deviation of the wavelength, and thus reduces the wavelength variability produced by the optical source.

Figure 9:
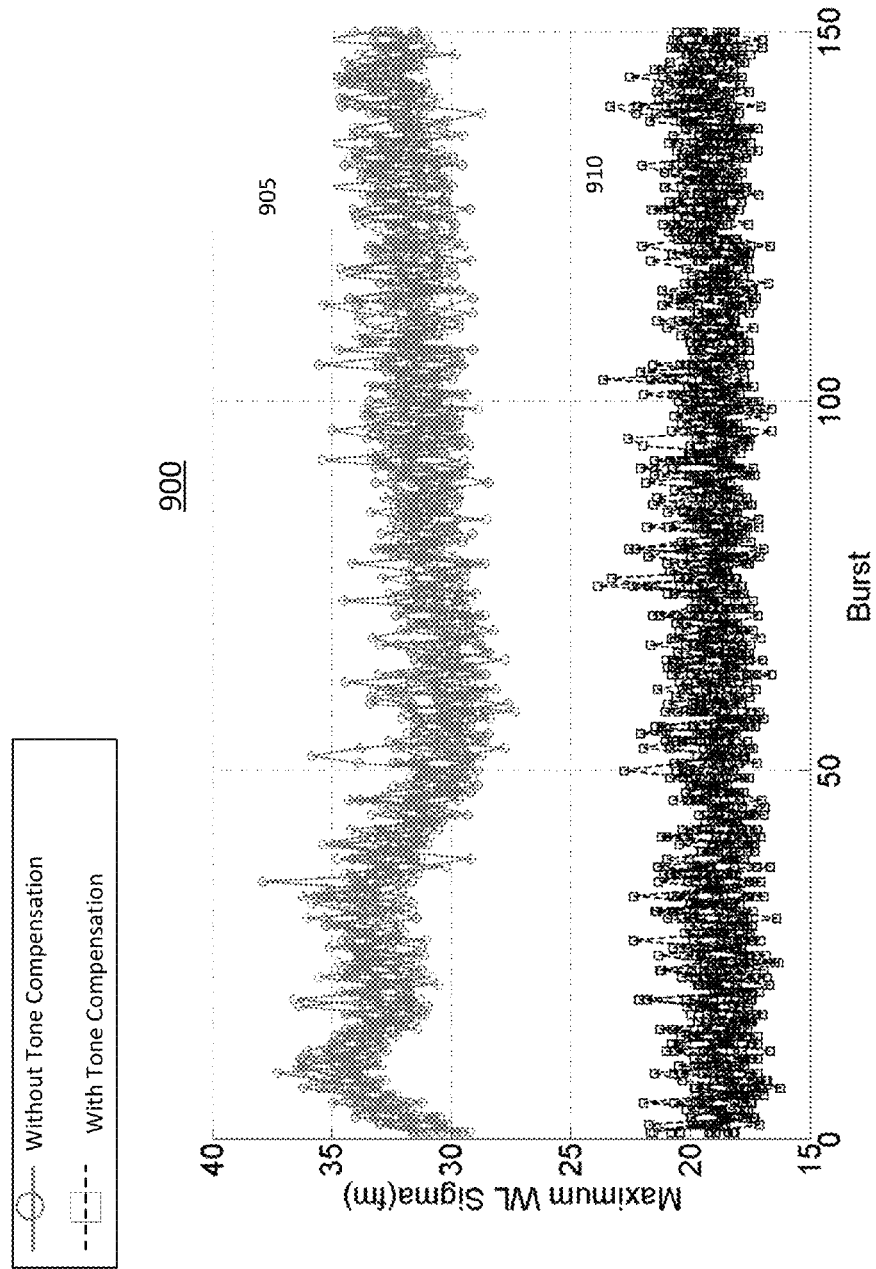
FIG. 9 is an exemplary plot of wavelength sigma based on the power spectral density of the wavelength error shown in FIG. 8.

Referring to FIG. 9, a plot of the maximum wavelength sigma per burst as a function of burst number derived from the data shown in FIG. 8 is shown. The plot 900 includes a wavelength sigma 905 for the data that was not compensated for the narrowband disturbance and a wavelength sigma 910 for the data that was compensated for the narrowband disturbance. As shown by comparing the curves 905 and 910, compensation for the narrowband disturbance reduces the maximum wavelength sigma for all of the observed bursts. Additionally, the wavelength sigma 905 and 910 were collected over ten (10) separate tests (or wafers), showing that the results are repeatable.

Other implementations are within the scope of the following claims.

What is claimed is:

1. A method comprising:
   determining first wavelength errors of a pulsed light beam, the first wavelength errors being based on a center wavelength associated with the pulsed light beam and actual wavelengths of a first plurality of pulses of the pulsed light beam;
   determining a frequency associated with a disturbance in the optical source, the determined frequency being an aliased frequency;
   applying a correction to the pulsed light beam, the correction being based on the aliased frequency; and
   determining second wavelength errors of the pulsed light beam, the second wavelength errors being based on the center wavelength and actual wavelengths of a second plurality of pulses of the pulsed light beam, the second plurality of pulses occurring after the correction is applied to the pulsed light beam, wherein
   a variation of the second wavelength errors is less than a variation of the first wavelength errors or at least one of the second wavelength errors is less than all of the first wavelength errors.

2. The method of claim 1, wherein the variation of the second wavelength errors is less than a variation of the first wavelength errors and at least one of the second wavelength errors is less than all of the first wavelength errors.

3. The method of claim 1, wherein applying a correction to the pulsed light beam comprises determining a correction waveform based on the aliased frequency.

4. The method of claim 3, wherein applying a correction to the pulsed light beam comprises applying the determined correction waveform to an optical assembly, the optical assembly comprising an optical element positioned to interact with light that propagates in the optical source, the application of the correction waveform to the optical assembly being sufficient to move the optical element.

5. The method of claim 3, wherein the correction waveform comprises an amplitude that is substantially the same as an amplitude of the disturbance and a phase that is shifted relative to a phase of the disturbance.

6. The method of claim 5, wherein the phase of the correction waveform is shifted by one hundred and eighty degrees relative to the phase of the disturbance.

7. The method of claim 1, wherein the disturbance comprises a plurality of separate and distinct frequencies.

8. The method of claim 7, wherein the plurality of frequencies comprises a fundamental frequency and one or more harmonics of the fundamental frequency.

9. The method of claim 1, wherein the pulsed light beam is associated with a repetition rate, and the aliased frequency varies with the repetition rate.

10. The method of claim 1, wherein the first plurality of pulses and the second plurality of pulses comprise the same number of pulses.

11. The method of claim 1, wherein
   the center wavelength is a nominal wavelength of the pulses in the pulsed light beam,
   the first wavelength errors comprise a difference between the center wavelength and the actual wavelength for each of the pulses in the first plurality of pulses, and
   the second wavelength errors comprise a difference between the center wavelength and the actual wavelength for each of the pulses in the second plurality of pulses.

12. The method of claim 11, wherein the variation of the first wavelength errors comprises a standard deviation of the first wavelength errors, and the variation of the second wavelength errors comprises a standard deviation of the second wavelength errors.

13. The method of claim 11, further comprising:
   determining the actual wavelength of each pulse in the first plurality of pulses based on measured data; and
   determining the actual wavelength of each pulse in the second plurality of pulses based on measured data.

14. A system comprising:
   an optical source configured to produce a pulsed light beam, the pulsed light beam being associated with a center wavelength, the optical source comprising:
      a chamber,
      a gaseous gain medium in the chamber,
      an optical assembly comprising at least one optical element, and
      a fan configured to circulate the gaseous gain medium in the chamber; and
   a control system configured to communicate with the optical source, the control system operable to:
   determine first wavelength errors of a pulsed light beam, the first wavelength errors being based on the center wavelength and actual wavelengths of a first plurality of pulses of the pulsed light beam;
   determine a frequency associated with a disturbance in the optical source, the determined frequency being an aliased frequency;
   apply a correction to the pulsed light beam, the correction being based on the aliased frequency; and
   determine second wavelength errors of the pulsed light beam, the second wavelength errors being based on the center wavelength and actual wavelengths of a second plurality of pulses of the pulsed light beam, the second plurality of pulses occurring after the correction is applied to the pulsed light beam, wherein
   a variation of the second wavelength errors is less than a variation of the first wavelength errors or at least one of the second wavelength errors is less than all of the first wavelength errors.

15. The system of claim 14, further comprising a line center analysis module, the line center analysis module being configured to measure the wavelength of pulses in the pulsed light beam.

16. The system of claim 15, wherein the control system is operable to determine the actual wavelengths of the first plurality of pulses based on an indication of a wavelength of the pulses in the first plurality of pulses from the line center analysis module, and the control system is operable to determine the second actual wavelengths of the second plurality of pulses based on an indication of a wavelength of the pulsed light beam at the second time from the line center analysis module.

17. The system of claim 14, wherein the control system being operable to apply a correction to the pulsed light beam comprises the control system being operable to apply a correction waveform to the optical assembly of the optical source, the correction waveform being sufficient to move the at least one optical element of the optical assembly.

18. The system of claim 17, wherein the at least one optical element comprises a prism.

19. The system of claim 14, further comprising a lithography exposure apparatus configured to communicate with the control system.

20. The system of claim 14, wherein the fan is configured to rotate at an angular frequency, and the disturbance in the optical source is associated with the rotation of the fan.

21. The system of claim 14, wherein the disturbance comprises a plurality of separate and distinct frequencies.

22. A control system for an optical source, the control system comprising:
one or more electronic processors; and
a non-transitory computer-readable storage medium, the medium comprising instructions that, when executed, cause the one or more processors to:
determine first wavelength errors of a pulsed light beam, the first wavelength errors being based on a center wavelength of the pulsed light beam and actual wavelengths of a first plurality of pulses of the pulsed light beam;
determine a frequency associated with a disturbance in the optical source, the determined frequency being an aliased frequency;
apply a correction to the pulsed light beam, the correction being based on the aliased frequency; and
determine second wavelength errors of the pulsed light beam, the second wavelength errors being based on the center wavelength and actual wavelengths of a second plurality of pulses of the pulsed light beam, the second plurality of pulses occurring after the correction is applied to the pulsed light beam, wherein a variation of the second wavelength errors is less than a variation of the first wavelength errors or at least one of the second wavelength errors is less than all of the first wavelength errors.

\* \* \* \* \*